United States Patent
Kato et al.

(10) Patent No.: US 10,714,082 B2
(45) Date of Patent: Jul. 14, 2020

(54) INFORMATION PROCESSING APPARATUS, INFORMATION PROCESSING METHOD, AND PROGRAM

(71) Applicant: SONY CORPORATION, Tokyo (JP)

(72) Inventors: Ayumi Kato, Kanagawa (JP); Kunihito Sawai, Kanagawa (JP); Shinichi Kawano, Tokyo (JP); Yuhei Taki, Kanagawa (JP); Yusuke Nakagawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 319 days.

(21) Appl. No.: 15/523,880

(22) PCT Filed: Jul. 20, 2016

(86) PCT No.: PCT/JP2016/071296
§ 371 (c)(1),
(2) Date: May 2, 2017

(87) PCT Pub. No.: WO2017/068826
PCT Pub. Date: Apr. 27, 2017

(65) Prior Publication Data
US 2017/0337919 A1 Nov. 23, 2017

(30) Foreign Application Priority Data
Oct. 23, 2015 (JP) .................................. 2015-208772

(51) Int. Cl.
*G10L 15/22* (2006.01)
*G10L 15/02* (2006.01)
*G10L 15/06* (2013.01)
*G10L 15/26* (2006.01)
(Continued)

(52) U.S. Cl.
CPC .............. *G10L 15/22* (2013.01); *G06F 3/167* (2013.01); *G10L 15/02* (2013.01); *G10L 15/063* (2013.01); *G10L 15/26* (2013.01); *G10L 2015/088* (2013.01); *G10L 2015/221* (2013.01); *G10L 2015/223* (2013.01)

(58) Field of Classification Search
CPC ....... G10L 15/22; G10L 15/02; G10L 15/063; G10L 15/26; G10L 2015/088; G10L 2015/221; G10L 2015/223; G06F 3/167
See application file for complete search history.

(56) References Cited

U.S. PATENT DOCUMENTS 5,799,065 A * 8/1998 Junqua .................... G10L 15/08
  379/216.01
7,143,037 B1 * 11/2006 Chestnut ................. G10L 15/22
  704/251

(Continued)

*Primary Examiner* — Sonia L Gay
(74) *Attorney, Agent, or Firm* — Paratus Law Group, PLLC

(57) ABSTRACT

There is provided an information processing apparatus, an information processing method, and a program, in which a database in which unknown words are registered is able to be efficiently created, the information processing apparatus including: an identifying portion that identifies a word uttered according to a predetermined utterance method, from within utterance information of a user, as an unknown word; and a processing portion that performs processing to register the unknown word that has been identified.

21 Claims, 10 Drawing Sheets

(51) Int. Cl.
*G10L 15/08* (2006.01)
*G06F 3/16* (2006.01)

(56) References Cited

U.S. PATENT DOCUMENTS

| | | | |
|---|---|---|---|
| 7,292,986 B1* | 11/2007 | Venolia | G06F 3/167 704/270 |
| 2006/0173680 A1* | 8/2006 | Verhasselt | G10L 15/22 704/235 |
| 2011/0093261 A1* | 4/2011 | Angott | G10L 15/10 704/205 |
| 2013/0226591 A1* | 8/2013 | Ahn | G06F 3/167 704/275 |
| 2015/0269930 A1* | 9/2015 | Chien | G10L 15/22 704/251 |

* cited by examiner

910

| INDICATOR START TIME | 0.5ms |
|---|---|
| INDICATOR RECOGNITION TIME | 1.0ms |

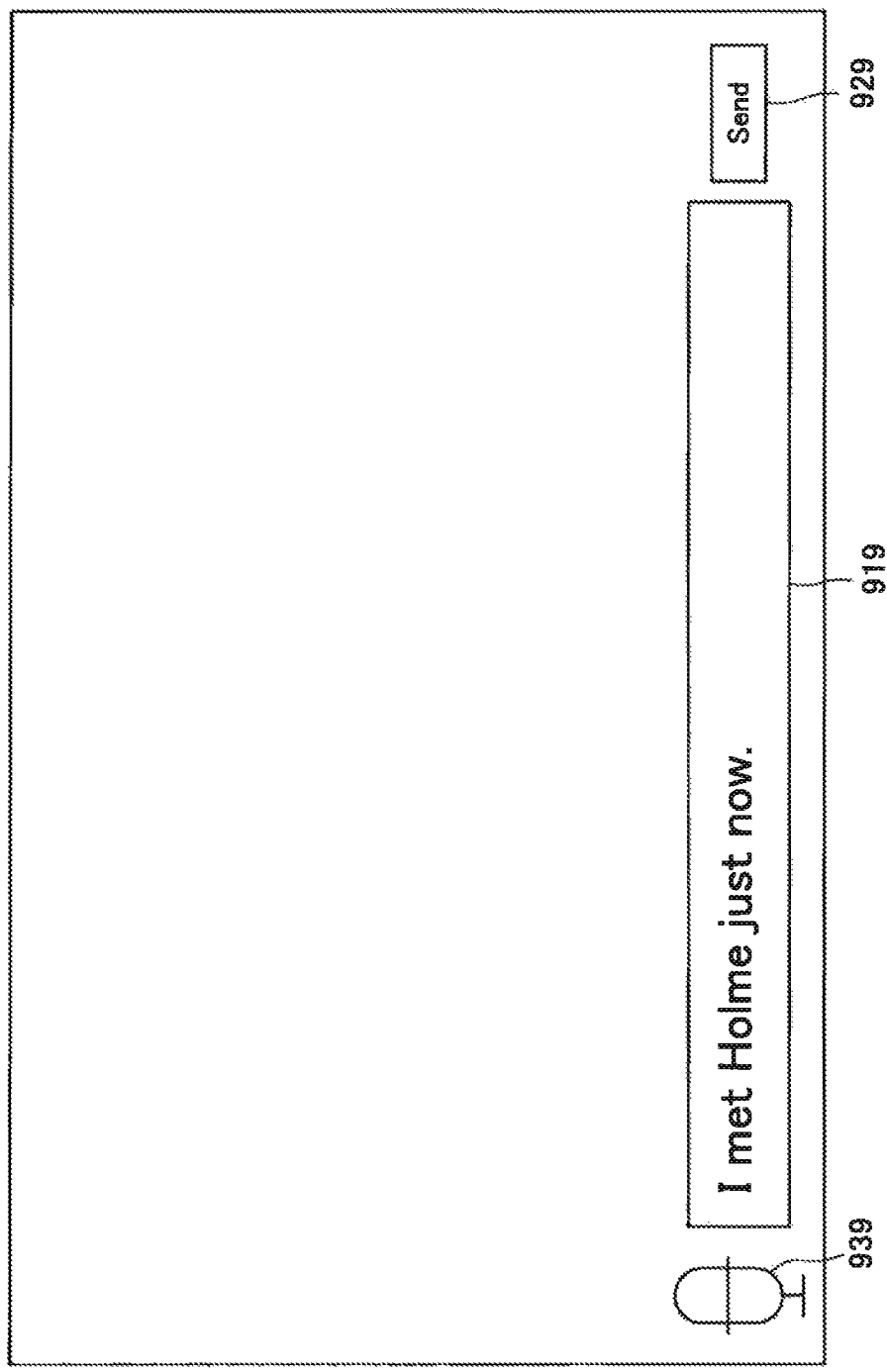

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2016/071296 (filed on Jul. 20, 2016) under 35 U.S.C. § 371, which claims priority to Japanese Patent Application No. 2015-208772 (filed on Oct. 23, 2015), which are all hereby incorporated by reference in their entirety.

TECHNICAL FIELD

The present disclosure relates to an information processing apparatus, an information processing method, and a program.

BACKGROUND ART

In recent years, it has become common for a user to input characters aurally due to improvements in speech recognition technology. However, utterance information included in sounds emitted by a user often includes unknown words not registered in a database (e.g., a corpus or the like), such as abbreviations, paraphrases, and proper nouns.

Therefore, unknown words included in utterance information of the user must be properly recognized in order to convert the utterance information of the user into proper notation. Recognized unknown words are registered in a database, and so will thereafter be converted into proper notation.

An example of such technology may be technology which, in continuous dialogue between users, extracts unknown words from dialogue content and registers the unknown words in a predetermined database without making the user aware of the registration mode, as described in Patent Literature 1 below, for example.

CITATION LIST

Patent Literature

Patent Literature 1: JP 2003-271180A

DISCLOSURE OF INVENTION

Technical Problem

However, with the technology described in Patent Literature 1, all words that are not registered in the predetermined database will be automatically registered, so even words that the user does not use frequently will end up being registered as unknown words. As a result, a database created by the technology described in Patent Literature 1 has an excess of registered unknown words, and is therefore not efficient.

However, the present disclosure proposes a novel and improved information processing apparatus, information processing method, and program, in which a database in which unknown words are registered is able to be efficiently created.

Solution to Problem

According to the present disclosure, there is provided an information processing apparatus including: an identifying portion that identifies a word uttered according to a predetermined utterance method, from within utterance information of a user, as an unknown word; and a processing portion that performs processing to register the unknown word that has been identified.

According to the present disclosure, there is provided an information processing method performed by an operation processing device, the method including: identifying a word uttered according to a predetermined utterance method, from within utterance information of a user, as an unknown word; and performing processing to register the unknown word that has been identified.

According to the present disclosure, there is provided a program that causes a computer to function as: an identifying portion that identifies a word uttered according to a predetermined utterance method, from within utterance information of a user, as an unknown word; and a processing portion that performs processing to register the unknown word that has been identified.

According to the present disclosure, a user is able to consciously register unknown words that are used with high frequency.

Advantageous Effects of Invention

According to the present disclosure as described above, a database in which unknown words are efficiently registered is able to be created.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12 is an explanatory view of an example of an image when a registered unknown word has been aurally input according to a normal utterance method.

MODE(S) FOR CARRYING OUT THE INVENTION

Figure 1:
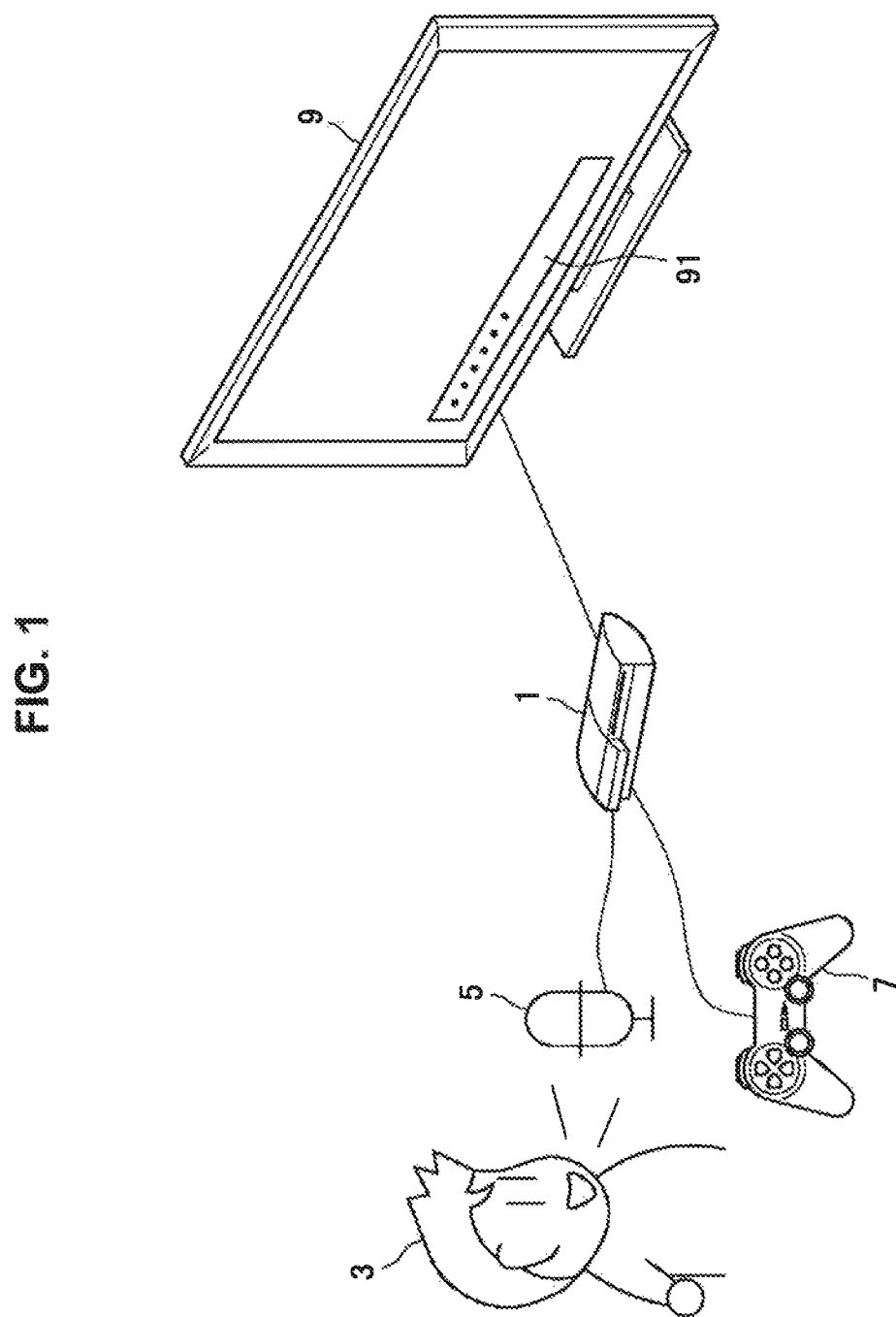
FIG. 1 is an explanatory view illustrating an outline of an information processing apparatus according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be given in the following order.
1. Outline of information processing apparatus
2. Configuration example of the information processing apparatus
3. Example of operation of the information processing apparatus
4. Specific examples of inputting an unknown word
4.1. First input example
4.2. Second input example
4.3. Third input example
4.4. Example of input correction
4.5. Modified example
5. Hardware configuration example
6. Summary

1. OUTLINE OF INFORMATION PROCESSING APPARATUS

First, an outline of an information processing apparatus according to an embodiment of the present disclosure will be described with reference to FIG. 1. FIG. 1 is an explanatory view illustrating an outline of an information processing apparatus 1 according to the present embodiment.

The information processing apparatus 1 is connected to a voice input device and a display device 9, for example, as shown in FIG. 1. The information processing apparatus 1 may also be connected to an operation input device 7.

The information processing apparatus 1 recognizes utterance information that has been aurally input via the voice input device 5 by a user 3, and generates an utterance image 91 in which recognized utterance information is displayed with characters. More specifically, the information processing apparatus 1 recognizes utterance information of the user 3 from the voice of the user 3 that has been picked up by the voice input device 5, and generates the utterance image 91 that shows the recognized utterance information. The utterance image 91 may be visually recognized by the user 3 by being displayed on the display device 9, for example.

The user 3 inputs the utterance information using the voice input device 5. For example, the user 3 may be a user that plays a video game or the like displayed on the display device 9 using the operation input device 7, while voice chatting using the voice input device 5.

The voice input device 5 picks up the voice of the user 3, and inputs the voice to the information processing apparatus 1. The voice input device 5 may be, for example, a microphone arranged in front of the display device 9, a microphone built into the operation input device 7, or a headset worn by the user 3.

The operation input device 7 receives input other than the voice of the user 3, and inputs this input to the information processing apparatus 1. The operation input device 7 may be, for example, a controller for operating a video game or the like displayed on the display device 9.

The display device 9 displays an image generated by the information processing apparatus 1 or the like. The mode of the display device 9 is not particularly limited as long as the display device 9 includes a display device such as a cathode ray tube (CRT) display device, a liquid crystal display device, and an organic electroluminescent display device, for example. The display device 9 may be, for example, a personal computer provided with a display device, a television device, a smartphone, a wearable device provided with a display device, and a see-through or non-see-through head-mounted display device or the like.

Here, it is highly likely that a voice signal for a word not registered in a database used for utterance information recognition will be segmented or recognized in notation which are unintended by the user 3, in speech recognition of the information processing apparatus 1. In such a case, the user 3 must re-input the utterance information in order to correct the word recognized with the unintended notation to the intended notation, which makes voice input less convenient.

In particular, a video game often has peculiar proper nouns. Such proper nouns are often not registered in a database (e.g., a corpus or the like) used for normal utterance information recognition, so it is highly likely that such proper nouns will be segmented or recognized in notation which are unintended by the user 3.

Also, even if a dictionary database for the video game is prepared, colloquial expressions such as abbreviations, slang, and unique paraphrases are often used when voice chatting and the like, so unknown words that are not registered in the database are sometimes coined by the user. New unknown words are conceivably being coined every day by the user 3 when voice chatting or the like in which many colloquial expressions are used.

Therefore, there is a need for unknown words included in utterance information of the user 3 to be efficiently registered in a database used for utterance information recognition.

The information processing apparatus 1 according to the present embodiment identifies a word that satisfies a predetermined condition, from within utterance information of the user 3, and performs processing to register the identified 6 unknown word in a database used for utterance information recognition.

Here, a word that satisfies a predetermined condition is a word uttered by the user 3 according to a predetermined utterance method. For example, the information processing apparatus 1 may identify a word uttered with a predetermined pause after each character as an unknown word, identify a word uttered with each character having a predetermined prolonged sound as an unknown word, or a word uttered at or louder than a predetermined volume as an unknown word, but this will be described in detail later. Furthermore, the information processing apparatus 1 may identify a word uttered sandwiched between predetermined words as an unknown word.

Therefore, the information processing apparatus 1 according to the present embodiment enables a user to consciously register an unknown word, so unknown words can be efficiently registered in a database. Further, an unknown word is able to be efficiently identified without sacrificing operability and convenience to the user 3 when using utterance according to a predetermined utterance method to identify an unknown word.

Also, the information processing apparatus 1 regards a registered unknown word as a single word, preferentially segments the registered unknown word, and aurally recognizes the registered unknown word. Therefore, the user 3 is able to intentionally register an unknown word, so the occurrence of an unknown word being segmented or recognized in notification that are unintentional is reduced. Accordingly, the information processing apparatus 1 is able to make voice input more convenient for the user 3.

2. CONFIGURATION EXAMPLE OF THE INFORMATION PROCESSING APPARATUS

Figure 2:
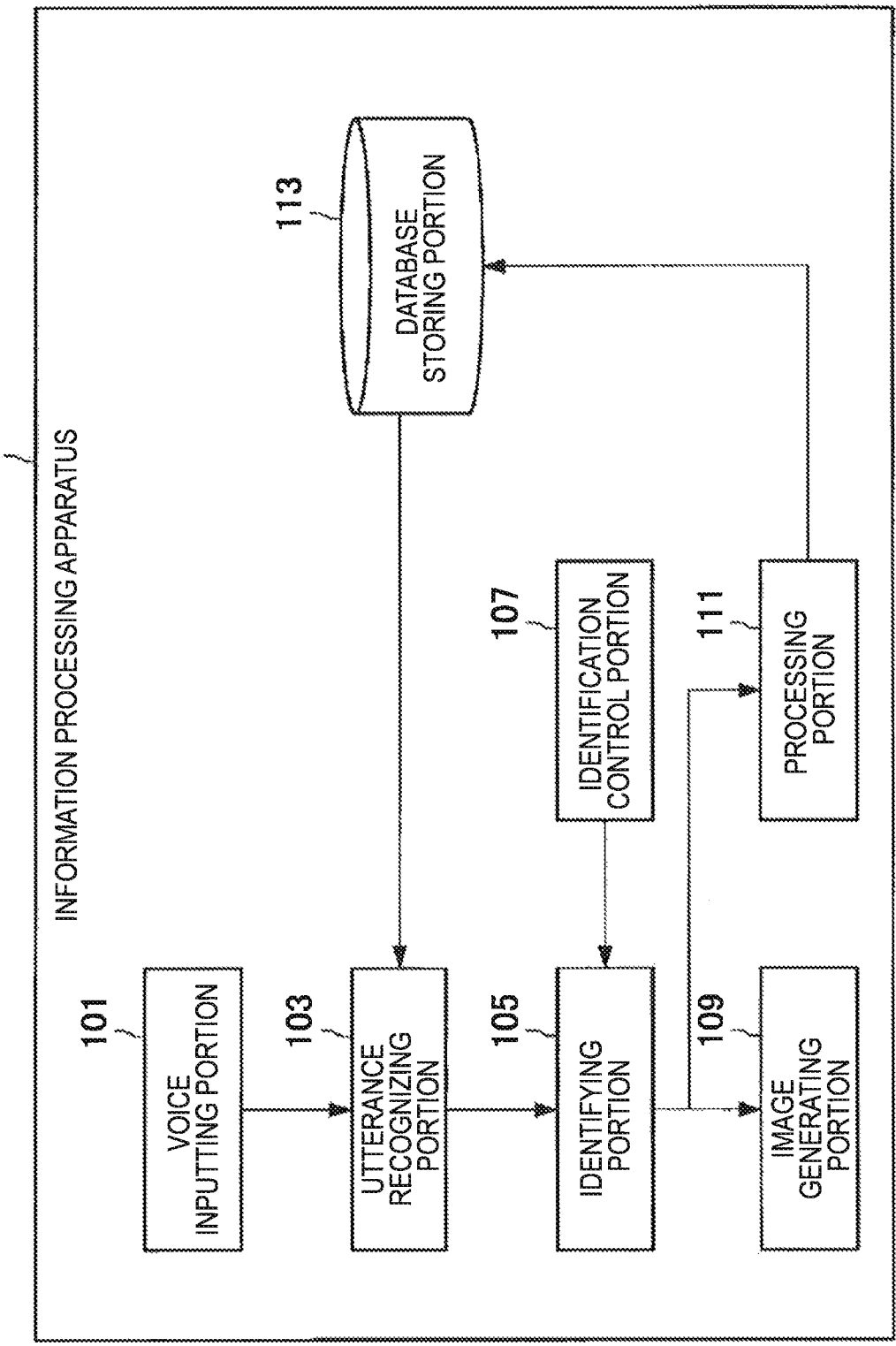
FIG. 2 is a block diagram illustrating a functional configuration of the information processing apparatus according to the embodiment.

Next, a configuration of the information processing apparatus 1 according to the present embodiment will be described with reference to FIG. 2. FIG. 2 is a block diagram illustrating a functional configuration of the information processing apparatus 1 according to the present embodiment.

The information processing apparatus 1 includes a voice acquiring portion 101, an utterance recognizing portion 103, an identifying portion 105, an identification control portion 107, an image generating portion 109, a processing portion 111, and a database storing portion 113, as shown in FIG. 2. The database storing portion 113 may be included in an external storage device that is connected to the information processing apparatus 1.

The voice acquiring portion 101 acquires a voice signal emitted by the user 3 from the voice input device 5. More specifically, the voice acquiring portion 101 may be a connection interface that is able to receive a signal input from the voice input device 5. For example, the voice acquiring portion 101 may be external input interface formed by a universal serial bus (USB) port, an Ethernet (registered trademark) port, an IEEE802.11 standard port, and a wired or wireless connection port such as an optical audio terminal.

The utterance recognizing portion 103 converts the voice signal emitted by the user 3 into utterance information written in characters, by aurally recognizing the voice signal emitted by the user 3. More specifically, the utterance recognizing portion 103 recognizes a string of words determined to be closest to the input voice as utterance information emitted by the user 3, by extracting a characteristic parameter from the voice signal emitted by the user 3, and referencing various databases on the basis of the extracted characteristic parameter.

Examples of a characteristic parameter that the utterance recognizing portion 103 uses for voice signal recognition may be spectrum, fundamental frequency, formant frequency, power linear predictive coefficient, cepstral coefficient, and line spectral pairs, or the like.

The database storing portion 113 stores various databases used for speech recognition by the utterance recognizing portion 103. For example, the database storing portion 113 may store an acoustic model database, a language model database, and a dictionary database and the like.

For example, an acoustic model database is a database that is a collection of acoustic models representing acoustic characteristics such as individual phonemes and syllables and the like in the language of the voice to be aurally recognized. A hidden Markov model or the like, for example, may be used as an acoustic model. Also, a dictionary database is a database that is a collection of information relating to pronunciation of individual words to be aurally recognized, and information relating to linkage relationships between phonemes and syllables, and the like, and a language model database is a database that is a collection of information relating to the manner in which individual words registered in the dictionary database connect together.

The utterance recognizing portion 103 is able to recognize a voice signal emitted by the user 3, and output the content of the recognized utterance information in characters by referring to these various databases.

These various databases may be prepared for each user 3, or a common database may be prepared for a video game or a chat room in which the user 3 participates, or the like.

The identifying portion 105 identifies a word that satisfies a predetermined condition, from within the utterance information of the user 3, and determines that the identified word is an unknown word. More specifically, the identifying portion 105 determines whether a word uttered according to a predetermined utterance method is included in the utterance information of the user 3, and if the word uttered according predetermined utterance method is included, identifies the word as an unknown word.

Here, the predetermined utterance method may be any utterance method as long as the utterance method can be consciously performed by the user 3. However, the predetermined utterance method is preferably an utterance method having a set threshold value in order to prevent an utterance of the user 3 from unintentionally being according to a predetermined utterance method. The information processing apparatus 1 may enable the user 3 to control whether to exceed a threshold value when uttering and adopt a predetermined utterance method, by indicating the threshold value to the user 3.

Examples of the predetermined utterance method described above may be a method of uttering a word with a pause of a length equal to or longer than a threshold value after each character, a method of uttering a word giving each character a prolonged sound of a length equal to or longer than a threshold value, and a method of uttering each character at a volume equal to or louder than a threshold value, and the like.

The identification control portion 107 controls identification of an unknown word by the identifying portion 105.

More specifically, the identification control portion 107 may control whether to execute unknown word identification by the identifying portion 105. For example, the identification control portion 107 may acquire eye gaze information of the user 3, and control the identifying portion 105 such that unknown word identification is not executed when the gaze of the user 3 is not aimed at the display device 9. This is to prevent a word included in the utterance information from satisfying the predetermined condition and being recognized as an unknown word without the intention of the user 3, because it is highly likely that the user 3 is not paying attention to the content of the utterance when the gaze of the user 3 is not aimed at the display device 9.

Also, the identification control portion 107 may control the predetermined condition used for unknown word identification by the identifying portion 105. For example, the identification control portion 107 may change the threshold value for the length of a pause when the predetermined condition is uttering with a pause of a length equal to or longer than a threshold value after each character of an unknown word. Also, the identification control portion 107 may change the threshold value for the length of a prolonged sound when the predetermined condition is uttering each character of an unknown word with a prolonged sound of a length equal to or longer than a threshold value. Moreover, the identification control portion 107 may change the threshold value for the loudness of volume when the predetermined condition is uttering each character of an unknown word at a volume equal to or louder than a threshold value.

Changing the predetermined condition used for identifying an unknown word in this way may be controlled on the basis of input by the user 3, or on the basis of information relating to a state of the user 3. More specifically, the identification control portion 107 may change a predetermined condition used to identify an unknown word, or a threshold value set for a predetermined condition, on the basis of input by the user 3.

The identification control portion 107 may also change a threshold value set 26 for a predetermined condition on the basis of information relating to the user 3.

More specifically, the identification control portion 107 may acquire biological information on the user 3 from various sensors provided in the voice input device 5 and the operation input device 7, and change a threshold value set for a predetermined condition on the basis of the state of the user 3 determined from the acquired biological information. Examples of the biological information on the user 3 that can be acquired from the various sensors may be heart rate (pulse), body temperature, amount of perspiration, blood pressure, and respiratory rate, and the like of the user 3.

For example, the identification control portion 107 may increase or reduce a threshold value set for a predetermined condition in accordance with the state of the user 3 when it is determined from the acquired biological information on the user 3 that the user 3 is tense or excited, and in a state of high concentration. As for how the identification control portion 107 controls a threshold value set for a predetermined condition, appropriate control is selected in accordance with the state of the user 3.

Also, more specifically, the identification control portion 107 may also change a threshold value set for a predetermined condition on the basis of the normal 16 manner of utterance information of the user 3. More specifically, the identification control portion 107 may reduce the threshold value for the length of a pause when the predetermined condition is uttering with a pause of a length equal to or longer than a threshold value after each character of an unknown word, and the normal rate of utterance of the user 3 is fast. The identification control portion 107 may also reduce the threshold value for the length of a prolonged sound when the predetermined condition is uttering each character of an unknown word with a prolonged sound of a length equal to or longer than a threshold value, and the normal rate of utterance of the user 3 is fast. Moreover, the identification control portion 107 may increase the threshold value for the loudness of volume when the predetermined condition is uttering each character of an unknown word at a volume equal to or louder than a threshold value, and the normal volume of utterance of the user 3 is loud. In such a case, the identification control portion 107 is able to optimize a predetermined condition for identifying an unknown word for each user 3, and thus able to reduce the burden of registering an unknown word on the user 3.

The identification control portion 107 may also change a threshold value set for a predetermined condition on the basis of information relating to the content of utterance information from the user 3 that is input. More specifically, the identification control portion 107 may change a threshold value set for a predetermined condition on the basis of the type of content of utterance information 6 from the user 3 that is input.

For example, the identification control portion 107 may increase the threshold value for the length of a pause when the predetermined condition is uttering with a pause of a length equal to or longer than a threshold value after each character of an unknown word, and the content of utterance information that is input is a mailer or a text editor or the like. Also, the identification control portion 107 may reduce the threshold value for the length of a pause when the content of utterance information that is input is instantaneous such as with chatting.

For example, the identification control portion 107 may increase the threshold value for the length of a prolonged sound when the predetermined condition is uttering each character of an unknown word with a prolonged sound of a length equal to or longer than a threshold value, and the content of utterance information that is input is a mailer or a text editor or the like. Also, the identification control portion 107 may reduce the threshold value for the length of a prolonged sound when the content of utterance information that is input is instantaneous such as with chatting.

For example, the identification control portion 107 may reduce the threshold value for the loudness of volume when the predetermined condition is uttering each character of an unknown word at a volume equal to or louder than a threshold value, and the content of utterance information that is input is a mailer or a text editor or the like. The identification control portion 107 may also increase the threshold value for the loudness of volume when the content of utterance information that is input is instantaneous such as with chatting.

The identification control portion 107 may also change a threshold value set for a predetermined condition on the basis of information relating to an environment around the user 3. More specifically, the identification control portion 107 may also change a threshold value set for a predetermined condition on the basis of at least any one of illumination, location, situation, noise level, time, altitude, ambient temperature, wind direction, and air flow of the environment around the user 3.

For example, the identification control portion 107 may reduce the threshold value for the length of a pause in order to avoid noise contamination, when the predetermined condition is uttering with a pause of a length equal to or longer than a threshold value after each character of an unknown word, and the normal noise level of the environment around the user 3 is high. The identification control portion 107 may also increase the threshold value for the length of a pause when the noise level of the environment around the user 3 is high.

For example, the identification control portion 107 may reduce the threshold value for the length of a prolonged sound so that the user 3 can perform input quickly, when the predetermined condition is uttering each character of an unknown word with a prolonged sound of a length equal to or longer than a threshold value, and the user 3 is outdoors. The identification control portion 107 may also increase the threshold value for the length of a prolonged sound when the user 3 is indoors.

For example, the identification control portion 107 may increase the threshold value for the loudness of volume when the predetermined condition is uttering each character of an unknown word at a volume equal to or louder than a threshold value, and the noise level of the environment around the user 3 is high. The identification control portion 107 may also reduce the threshold value for the loudness of volume when the noise level of the environment around the user 3 is low.

The identification control portion 107 may also change a threshold value set for a predetermined condition on the basis of information relating to a voice input device that acquires utterance information. More specifically, the identification control portion 107 may change a threshold value set for a predetermined condition on the basis of at least one of processing speed of speech recognition, input sensitivity, how easily noise gets in, and directionality, of a voice input device that acquires utterance information.

For example, the identification control portion 107 may increase the threshold value for the length of a pause when the predetermined condition is uttering with a pause of a length equal to or longer than a threshold value after each character of an unknown word, and the processing speed of speech recognition of the voice input device is slow. The identification control portion 107 may also reduce the threshold value for the length of a pause when the processing speed of speech recognition of the voice input device is fast.

For example, the identification control portion 107 may reduce the threshold value for the length of a pause in order to avoid false detection, when the predetermined condition is uttering with a pause of a length equal to or longer than a threshold value after each character of an unknown word, and the noise level of the voice input device is high. The identification control portion 107 may also increase the threshold value for the length of a pause when the noise level of the voice input device is low.

For example, the identification control portion 107 may reduce the threshold value for the length of a prolonged sound in order to avoid false detection, when the predetermined condition is uttering each character of an unknown word with a prolonged sound of a length equal to or longer than a threshold value, and the noise level of the voice input device is high. The identification control portion 107 may also increase the threshold value for the length of a prolonged sound when the noise level of the voice input device is low.

For example, the identification control portion 107 may increase the threshold value for the loudness of volume when the predetermined condition is uttering each character of an unknown word at a volume equal to or louder than a threshold value, and the input sensitivity of the voice input device is high. The identification control portion 107 may also reduce the threshold value for the loudness of volume when the input sensitivity of the voice input device is low.

With the threshold value control described above, the identification control portion 107 is able to optimize a predetermined condition for identifying an unknown word for each user 3, and as a result, is able to reduce the burden of registering an unknown word on the user 3. However, the threshold value control by the identification control portion 107 is not limited to the examples described above. For example, the identification control portion 107 may also control the threshold value in a direction opposite the direction of threshold value control in the examples described above.

The image generating portion 109 generates an utterance image that displays utterance information of the user 3 with characters. More specifically, the image generating portion 109 generates an utterance image that displays utterance information of the user 3 that has been recognized by the utterance recognizing portion 103, converted into character notation. As a result, the user 3 is able to verify whether the content uttered by him or her is being accurately aurally recognized in the information processing apparatus 1 by verifying the character notation of the utterance information displayed in the utterance image.

Also, a word in an utterance image that has been identified by the identifying portion 105 as an unknown word may be displayed with predetermined phonograms such as hiragana, katakana, or romaji. This is because with an unknown word, the kanji conversion intended by the user 3 is unclear, so it is more appropriate to display the unknown word with phonograms than with ideograms such as kanji. Also, displaying an unknown word with predetermined phonograms makes it possible to clearly indicate that the unknown word is an unsegmented single word.

A word in an utterance image that has been identified by the identifying portion 105 as an unknown word may also be displayed in notation that differs from the notation of other utterance information. For example, a word identified as an unknown word may be displayed in a character color, character size, character font, or with a decorative character (such as in bold and italics, for example) that differ from that of other utterance information. As a result, the image generating portion 109 is able to clearly indicate to the user 3 which word uttered by the user 3 was identified.

Furthermore, the image generating portion 109 may generate an image that indicates whether a predetermined condition for identifying an unknown word in the utterance information of the user 3 is satisfied. More specifically, the image generating portion 109 may generate a threshold value image that displays a threshold value in a predetermined utterance method, and whether the utterance method is satisfying the threshold value, when identifying an unknown word according to whether an utterance has been made according to a predetermined utterance method for which a threshold value is set.

As a result, the user 3 is able to verify whether his or her utterance is satisfying a predetermined utterance method for identifying an unknown word. Therefore, the user 3 is able to avoid having an unintended word be identified as an unknown word, or having a word that the user 3 wishes to register as an unknown word not be identified as an unknown word.

The processing portion 111 performs processing for registering a word identified as an unknown word by the identifying portion 105. For example, when various databases used for speech recognition are stored in the database storing portion 113, the processing portion 111 may register a word identified as an unknown word by the identifying portion 105 in the various databases stored in the database storing portion 113. Also, when various databases used for speech recognition are stored in an external storage device of the information processing apparatus 1, the processing portion 111 may generate information necessary to register a word identified as an unknown word in the various databases, and output the generated information to the external databases.

The processing portion 111 performs processing for registering a word identified as an unknown word when the utterance information has been confirmed by the user 3. For example, when the user 3 is voice chatting and utterance information uttered by the user 3 is sent to a recipient as a message, the processing portion 11 may determine that the utterance information has been confirmed and perform processing to register a word identified as an unknown word.

However, the timing at which the processing to register a word identified as an unknown word is performed by the processing portion 111 is not limited to the timing described above. For example, with a user 3 with whom there is little correction of utterance information, the processing portion 111 may perform processing to register an unknown word in various databases when the user 3 utters the unknown word in a manner that satisfies a predetermined condition. Also, with an unknown word that is registered in a database of a predetermined number or more users, the processing portion 111 may perform processing to register an unknown word in various databases when the user 3 utters the unknown word in a manner that satisfies a predetermined condition.

Also, when a word similar to a registered unknown word is uttered, the processing portion 111 may determine that the word similar to a registered unknown word is also an unknown word, and perform processing to register the word in various databases. An example of a word that is similar to a registered unknown word may be a word in which a prefix or a suffix has been added to a registered unknown word. In such a case, the processing portion 111 may have the user 3 confirm whether to perform processing to register a word that is similar to a registered unknown word in various databases.

3. EXAMPLE OF OPERATION OF THE INFORMATION PROCESSING APPARATUS

Figure 3:
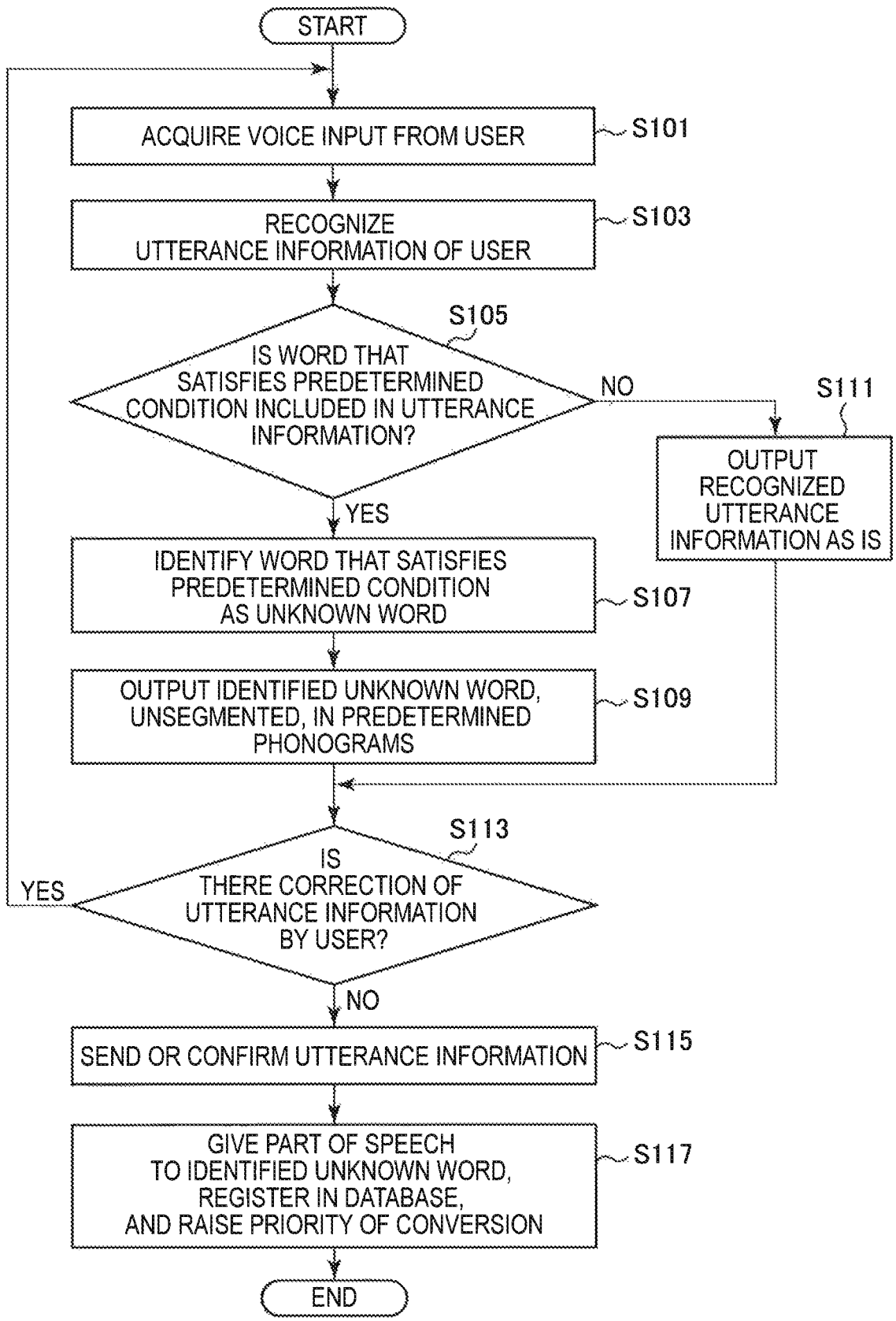
FIG. 3 is a flowchart illustrating an example of operation of the information processing apparatus according to the embodiment.

Continuing on, operation of the information processing apparatus 1 according to the present embodiment will be described with reference to FIG. 3. FIG. 3 is a flowchart illustrating an example of operation of the information processing apparatus 1 according to the present embodiment. Below, a word that satisfies a predetermined condition represents a word that has been uttered according to a predetermined utterance method.

As shown in FIG. 3, the voice acquiring portion 101 acquires a voice signal of the user 3 from the voice input device 5 or the like (S101). Next, the utterance recognizing portion 103 recognizes utterance information uttered by the user 3 from the voice signal (S103). Continuing on, the identifying portion 105 determines whether a word that satisfies a predetermined condition is included in the utterance information recognized by the utterance recognizing portion 103 (S105). If a word that satisfies a predetermined condition is included in the utterance information (Yes in S105), the identifying portion 105 identifies the word that satisfies the predetermined condition as an unknown word (S107). Also, the image generating portion 109 generates an utterance image that displays the identified unknown word, unsegmented, with predetermined phonograms (S109).

On the other hand, if a word that satisfies a predetermined condition is not included in the utterance information (No in S105), the image generating portion 109 generates an utterance image that displays the utterance information recognized by the utterance recognizing portion 103 as it is (S111).

Here, the voice acquiring portion 101 verifies whether there is a correction of the utterance information by the user 3 (S113), and if there is a correction of the utterance information (Yes in S113), acquires a voice signal for the correction of the utterance information (S101). On the other hand, if there is no correction of utterance information (No in S113), the utterance information is sent after being confirmed by the user 3 (S115). When an unknown word is identified, the processing portion 111 then gives a part of speech and the like to the identified unknown word, and registers the unknown word in various databases stored in the database storing portion 113 and the like. The processing portion 111 may also raise the priority of conversion of a registered unknown word (S117).

According to the configuration and operation described above, the information processing apparatus 1 enables the user 3 to intentionally register an unknown word by a more convenient method. Therefore, the information processing apparatus 1 is able to efficiently create a database in which unknown words are registered.

Also, an uttered unknown word that satisfies a predetermined condition is not segmented, but rather is regarded and aurally recognized as a single word, so the information processing apparatus 1 is able to prevent an unknown word from being segmented or displayed in notation that are unintended by the user 3. Also, a registered unknown word will hereinafter not be segmented, but rather will be regarded as a single word, so the information processing apparatus 1 is able to make voice input more convenient for the user 3.

4. SPECIFIC EXAMPLES OF INPUTTING AN UNKNOWN WORD

Next, specific examples of inputting an unknown word in the information processing apparatus 1 according to the present embodiment will be described with reference to FIGS. 4 to 12.

Figure 4:
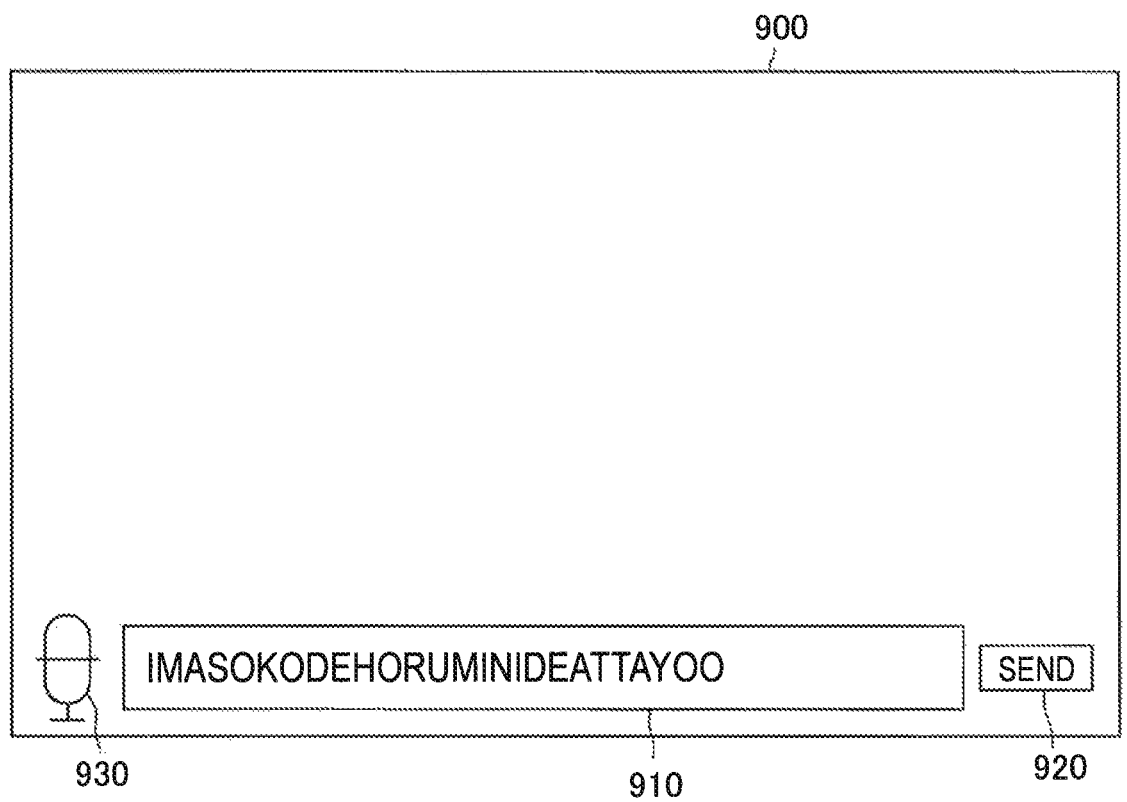
FIG. 4 is an explanatory view illustrating an example of an image in which an unknown word has been converted into unintended notation.

First, a case in which an unknown word is converted into unintended notation will be described with reference to FIG. 4. FIG. 4 is an explanatory view illustrating an example of an image in which an unknown word has been converted into unintended notation.

As shown in FIG. 4, utterance information that has been aurally input by the user 3 via the voice input device 5 is displayed in an input field 910 on a lower end of an image 900 of a video game or the like that is displayed on the display device 9. The user 3 is able to send the utterance information that has been aurally input to a recipient in a voice chat or the like, by pressing a send button 920 when the utterance information that has been aurally input is in appropriate notation as intended. A microphone image 930 is a schematic image of a microphone, which indicates that the utterance information displayed in the input field 910 is utterance information that has been input by voice input.

For example, a case will be assumed in which the user 3 aurally inputs "ima sokode horumini deattayoo," and "horumi" is an unknown word that is not registered in a database used for speech recognition. Here, with the information that has been aurally input, "horumi," which is not registered in a database, is not recognized as a single word. Instead, "ho," "ru," and "mi" are segmented and recognized individually, as shown in FIG. 4. Therefore, "horumi" in notation unintended by the user 3 will end up being input in the input field 910 due to "ho," "ru," and "mi" each being separately converted into kanji or the like. In such a case, the user 3 must correct the utterance information of "horumi" that has been input with unintended notation, by re-inputting the utterance information, or correct the utterance information by a method that does not rely on voice input, which makes voice input less convenient.

The information processing apparatus 1 according to the present embodiment enables the unknown word "horumi" described above to be notated with predetermined phonograms by the user 3 uttering in a manner that satisfies a predetermined condition. Also, the unknown word "horumi" is registered in a database by the user 3 uttering in a manner that satisfies a predetermined condition. "Horumi" that is registered in a database will thereafter not be segmented or the like, but rather will be recognized as a single word, even with normal voice input.

Specific examples of inputting an unknown word in the information processing apparatus 1 according to the present embodiment in this way will be described with first to third input examples as examples.

4.1. First Input Example

First, a first unknown word input example according to the present embodiment will be described with reference to FIGS. 5A to 7. FIGS. 5A to 5D are explanatory views of an example of an image of an input field in the first input example, and FIG. 6 is an explanatory view of an example of an image when a registered unknown word has been aurally input according to a normal utterance method. Also, FIG. 7 is an explanatory view of an example of a setting of a threshold value image indicating a time to a threshold value in a predetermined utterance method.

In the first unknown word input example, the information processing apparatus 1 identifies a word made up of characters as an unknown word when an utterance is emitted with a pause of a length equal to or longer than a predetermined value after each character. Therefore, the user 3 need only utter with a pause of equal to or longer than the threshold value after each of "ho," "ru," and "mi" when the user 3 wants the information processing apparatus 1 to identify "horumi" as an unknown word, for example.

Figure 5A:
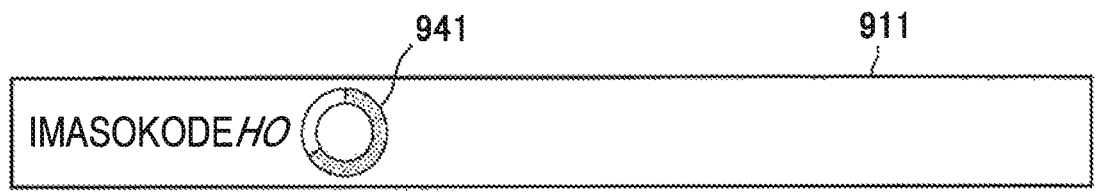
FIG. 5A is an explanatory view of an example of an image of an input field in a first input example.
Figures 6, 7:
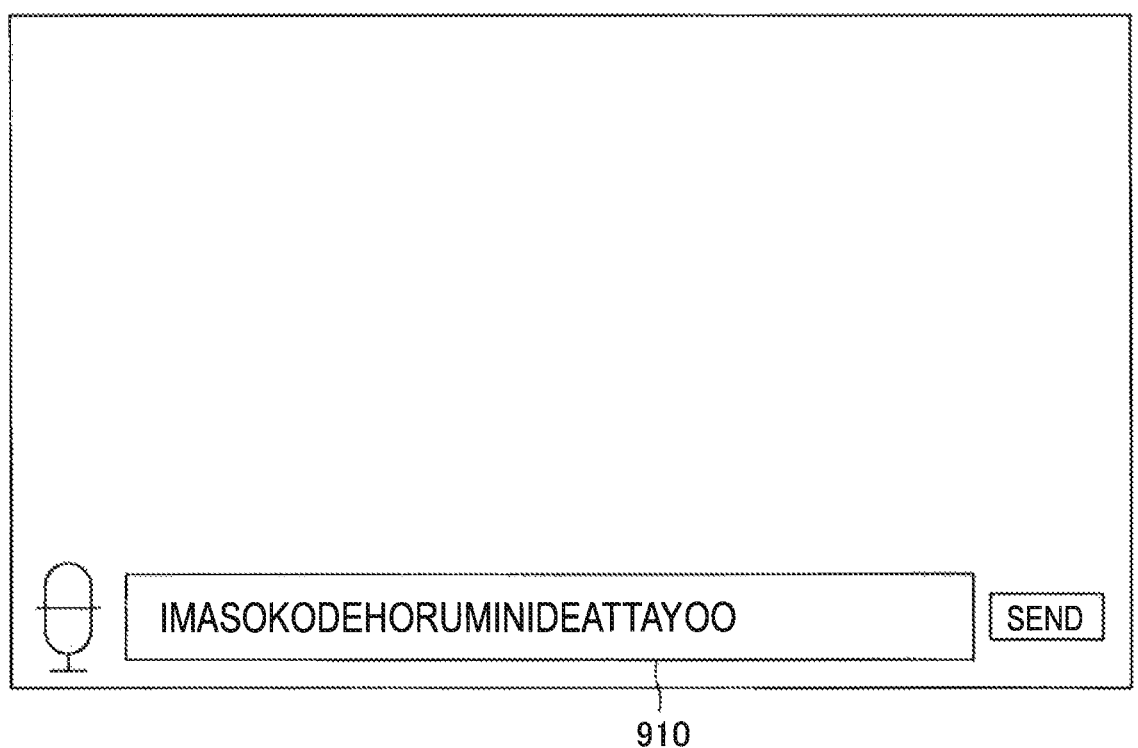
FIG. 6 is an explanatory view of an example of an image when a registered unknown word has been aurally input according to a normal utterance method.
FIG. 7 is an explanatory view of an example of a setting of a threshold value image indicating a time to a threshold value in a predetermined utterance method.

In such a case, a threshold value image 941 that is an indicator which indicates the time to a threshold value for identifying an unknown word is displayed in the input field 911 when the user 3 pauses after uttering "ho," as shown in FIG. 5A. The threshold value image 941 may be a ring-shaped image, for example, in which the display color of the ring gradually changes in the clockwise direction with the passage of time to the threshold value, and the elapsed time reaches the threshold value when the region where the color has changed goes all the way around. Also, the threshold value image 941 may be a horizontal bar-shaped image in which the display color of the bar gradually changes from the left, and the elapsed time reaches the threshold value when the region where the color has changed reaches the right of the bar.

Figure 5B:
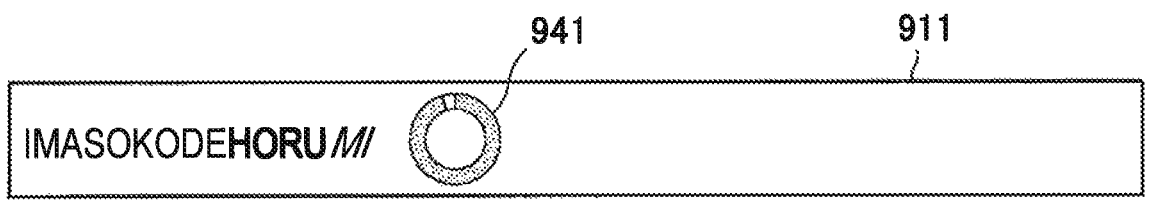
FIG. 5B is an explanatory view of an example of an image of an input field in a first input example.

If the user 3 wishes to register "horumi" as an unknown word, the user 3 need only pause until the region where the display color of the threshold value image 941 has changed goes all the way around (i.e., until the length of the pause exceeds the threshold value) after uttering each of the characters "ho," "ru," and "mi," and then utter the next character, as shown in FIG. 5B. In this way, the information processing apparatus 1 is able to guide the user 3 to the utterance method for identifying an unknown word, and thus is able to assist the user 3 with registering an unknown word.

Figure 5C:
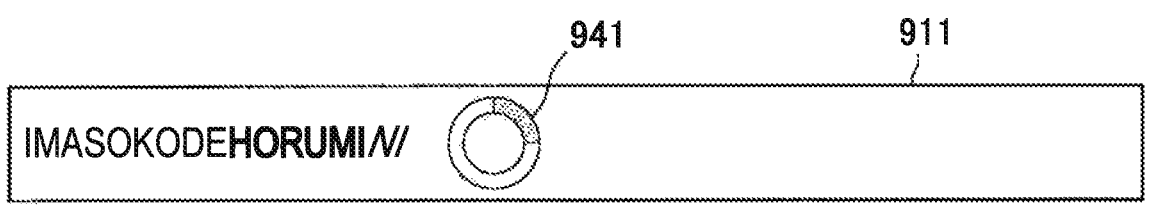
FIG. 5C is an explanatory view of an example of an image of an input field in a first input example.

If the user 3 does not want "ni" to be included in the unknown word after finishing aurally inputting "horumi," the user 3 utters the next character "de" before the region where the display color of the threshold value image 941 has changed goes all the way around (i.e., before the length of the pause exceeds the threshold value), as shown in FIG. 5C. As a result, the information processing apparatus 1 is able to identify "horumi," for which a pause of equal to or longer than the threshold value was given after uttering each character, as an unknown word.

Figure 5D:
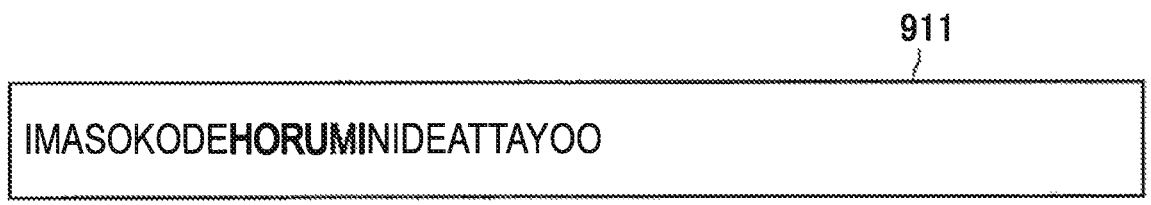
FIG. 5D is an explanatory view of an example of an image of an input field in a first input example.

"Horumi," which has been identified as an unknown word, is written "horumi" in katakana, which are predetermined phonograms, and is also displayed in decorative characters that differ from other characters, in the input field 911, as shown in FIG. 5D, for example. As a result, the user 3 is able to verify that "horumi" has been identified as an unknown word. When the user 3 verifies that "horumi" has been identified as an unknown word as intended, the user 3 is able to register "horumi" identified as an unknown word in a database by confirming the utterance information "imasokodehoruminideattayoo."

According to the input example illustrated in FIGS. 5A to 5D, when "horumi" has been registered in a database as an unknown word, "horumi" will be recognized as an unsegmented single word and will be displayed in the input field 910 even if the user 3 does not utter according to the predetermined utterance method, as shown in FIG. 6. The notation of "horumi" in this case may be in katakana that are predetermined phonograms. If the user 3 wishes to change the notation of "horumi," the user 3 may repeat the aural input of "horumi" until the desired notation is obtained.

As described above, the threshold value for the length of the pause can be changed by changing the setting of the display time of the threshold value image 941 that is an indicator which indicates the time to the threshold value for identifying an unknown word.

For example, an "indicator start time" that is the time until the threshold value image 941 is displayed after an unknown word is uttered, and an "indicator recognition time" that is the time until the change in the display color goes all the way around, are set for the threshold value image 941, as shown in FIG. 7. That is, the threshold value for the length of the pause is equal to the sum of the "indicator start time" and the "indicator recognition time." The time to the threshold value image 941 is displayed after an unknown word is uttered is set separately here in order to prevent the threshold value image 941 from being displayed each time a character is uttered even during normal utterance.

The "indicator start time" and the "indicator recognition time" may be changed by the user 3, but may also be dynamically changed by the information processing apparatus 1 on the basis of the normal rate of utterance of the user 3.

For example, the information processing apparatus 1 may calculate the rate of utterance of the user 3 when an unknown word is not included, from the utterance time for a predetermined amount of characters, and change the "indicator start time" and the "indicator recognition time" on the basis of the rate of utterance of the user 3.

The information processing apparatus 1 may also change the "indicator start time" and the "indicator recognition time" in accordance with the extent of the region where the display color of the threshold value image 941 has changed when the next word is uttered before the length of the pause reaches the threshold value. In this case, the information processing apparatus 1 may also change the "indicator start time" and the "indicator recognition time" such that the extent of the region where the display color of the threshold value image 941 has changed is approximately 50% to 60%.

The information processing apparatus 1 may also have a combination of a plurality of "indicator start times" and "indicator recognition times." This is to enable the information processing apparatus 1 to set an appropriate combination of an "indicator start time" and an "indicator recognition time" in accordance with the state of the user 3, e.g., tense or excited, in a state of high concentration, in a state of low concentration.

The state of the user 3 may be determined using the heart rate, body temperature, amount of perspiration, blood pressure, or respiratory rate or the like of the user 3, which can be acquired from various sensors provided in the voice input device 5 or the operation input device 7, as described above. The state of the user 3 may also be determined from the frequency or intensity or the like of an operation of the operation input device 7.

4.2. Second Input Example

Figure 8A:
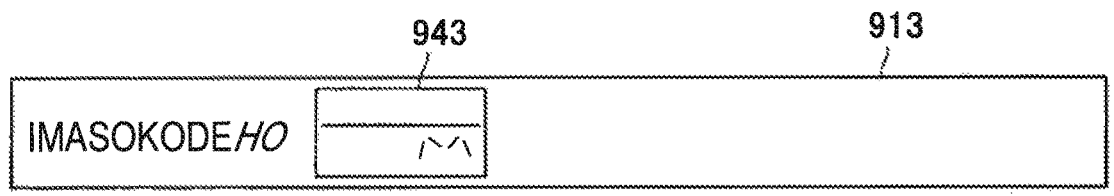
FIG. 8A is an explanatory view of an example of an image of an input field in a second input example.
Figure 8B:
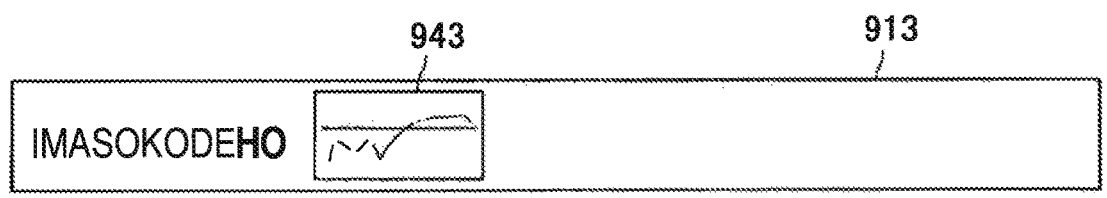
FIG. 8B is an explanatory view of an example of an image of an input field in the second input example.

Next, a second unknown word input example according to the present embodiment will be described with reference to FIGS. 8A and 8B. FIGS. 8A and 8B are explanatory views of an example of an image of an input field in the second input example.

In the second unknown word input example, the information processing apparatus 1 identifies a word made up of characters as an unknown word when each of the characters is uttered at a volume equal to or louder than a threshold value. Therefore, the user 3 need only utter each of "ho," "ru," and "mi" at a volume equal to or louder than a threshold value when the user 3 wants the information processing apparatus 1 to identify "horumi" as an unknown word, for example.

In such a case, a threshold value image 943 that is an indicator which indicates the volume of an utterance by the user 3, is displayed in the input field 913 when the user 3 utters "ho," as shown in FIG. 8A. For example, the threshold value image 943 may be a graph-like image in which the loudness of volume of an utterance by the user 3 is used for a vertical axis and time is used for a horizontal axis, and a threshold value for the loudness of volume is indicated by a line. The threshold value image 943 may also be constantly displayed in order to show the volume of utterance to the user 3.

If the user 3 wishes to register "horumi" as an unknown word, the user 3 need only utter each of "ho," "ru," and "mi" so that the volume graph crosses the threshold value line, as shown in FIG. 8B. Also, if the user 3 does not want "ni" to be included in the unknown word after finishing aurally inputting "horumi," the user 3 need only lower the volume of utterance so that the volume graph does not cross the threshold value line. As a result, the information processing apparatus 1 is able to guide the user 3 to the utterance method for identifying an unknown word.

Also, "horumi," which has been identified as an unknown word, is written "horumi" in katakana, which are predetermined phonograms, and is also displayed in decorative characters that differ from other characters, in the input field 913, similar to the first unknown word input example.

In the second unknown word input example, it is possible to change the threshold value for the loudness of volume for identifying an unknown word. In such a case, the threshold value for the loudness of volume may be changed by the user 3, or may be dynamically changed by the information processing apparatus 1 on the basis of the normal utterance volume of the user 3, similar to the "indicator start time" and the "indicator recognition time" in the first unknown word input example.

Furthermore, the threshold value for the loudness of volume may be changed appropriately in accordance with the state of the user 3.

4.3. Third Input Example

Continuing on, a third unknown word input example according to the present embodiment will be described with reference to FIGS. 9A to 9D. FIGS. 9A to 9D are explanatory views of an example of an image of an input field in the third input example.

In the third unknown word input example, the information processing apparatus 1 identifies a word made up of characters as an unknown word when each of the characters is uttered with a prolonged sound of a length equal to or longer than a threshold value. Therefore, when the user 3 wants the information processing apparatus 1 to identify "ajiina" as an unknown word, for example, the user 3 need only utter each of "a," "jii," and "na" with a prolonged sound of a length equal to or longer than the threshold value. The unknown word itself has a prolonged sound, so "jii" needs to be uttered with a prolonged sound that is even longer than it is with "ji."

Figure 9A:
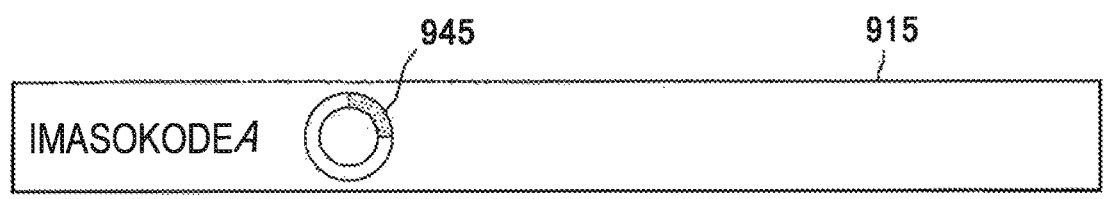
FIG. 9A is an explanatory view of an example of an image of an input field in a third input example.

In such a case, a threshold value image 945 that is an indicator which indicates the time to a threshold value for identifying an unknown word is displayed in the input field 915 when the user 3 utters "a" with a prolonged sound, as shown in FIG. 9A. The threshold value image 945 may be a ring-shaped image, for example, in which the display color of the ring gradually changes in the clockwise direction with the passage of time to the threshold value, and the elapsed time reaches the threshold value when the region where the color has changed goes all the way around. Also, the threshold value image 945 may be a horizontal bar-shaped image in which the display color of the bar gradually changes from the left, and the elapsed time reaches the threshold value when the region where the color has changed reaches the right of the bar.

If the user 3 wishes to register "ajiina" as an unknown word, the user 3 need only lengthen the prolonged sound until the region where the display color of the threshold value image 945 has changed goes all the way around (i.e., until the length of the prolonged sound exceeds the threshold value) after uttering each of the characters "a," "jii," and "na," and then utter the next character, as shown in FIG. 9A. As a result, the information processing apparatus 1 is able to guide the user 3 to the utterance method for identifying an unknown word.

Figure 9B:
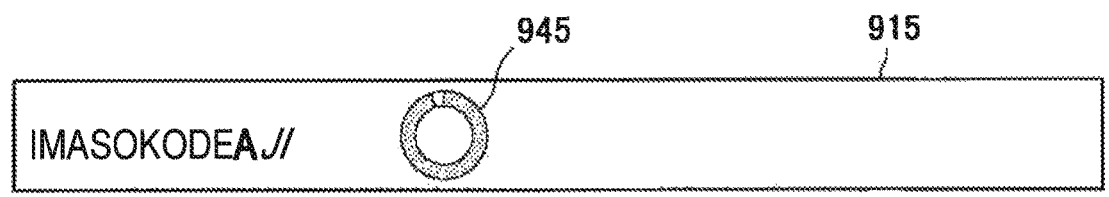
FIG. 9B is an explanatory view of an example of an image of an input field in the third input example.
Figure 9C:
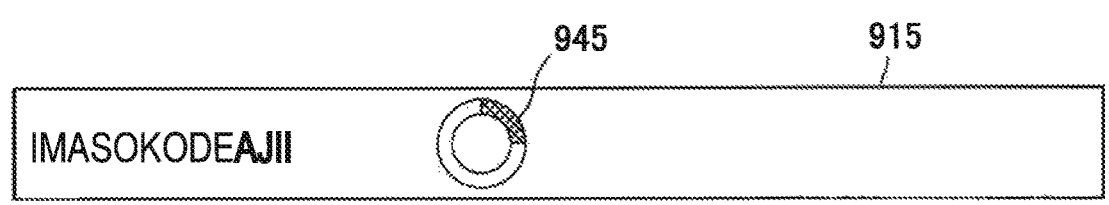
FIG. 9C is an explanatory view of an example of an image of an input field in the third input example.

In the third unknown word input example, a prolonged sound determination image 946 that is an indicator which indicates the time to a threshold at which an unknown word is identified as having a prolonged sound is also displayed in order to determine whether the unknown word itself has a prolonged sound. The prolonged sound determination image 946 continues to be displayed after the threshold value image 945 that is an indicator which indicates the time to the threshold value for identifying an unknown word is displayed, as shown in FIGS. 9B and 9C. The prolonged sound determination image 946 may be an image similar to the threshold value image 945, but it may also be an image that can be visually recognized as a different indicator by changing at least one of the shape or the color.

The user 3 is able to input an unknown word that includes a prolonged sound by extending an utterance until the region where the display color of the threshold value image 945 has changed goes all the way around, and then further extending the prolonged sound until the region where the display color of the prolonged sound determination image 946 goes all the way around (i.e., until the length of the prolonged sound exceeds a threshold value for identifying whether there is a prolonged sound). The information processing apparatus 1 determines that the unknown word itself does not have a prolonged sound if lengthening of the prolonged sound stops before the region where the display color of the prolonged sound determination image 946 goes all the way around (i.e., before the length of the prolonged sound exceeds the threshold value for determining whether there is a prolonged sound).

Moreover, if the user 3 does not want "ni" to be included in the unknown word after finishing aurally inputting "ajiina," the user 3 stops lengthening the prolonged sound of "ni" and utters the next character "de" before the region where the display color of the threshold value image 945 has changed goes all the way around (i.e., before the length of the prolonged sound exceeds the threshold value). As a result, the information processing apparatus 1 is able to identify "ajiina," in which each character was uttered with a prolonged sound equal to or longer than the threshold value, as an unknown word.

Figure 9D:
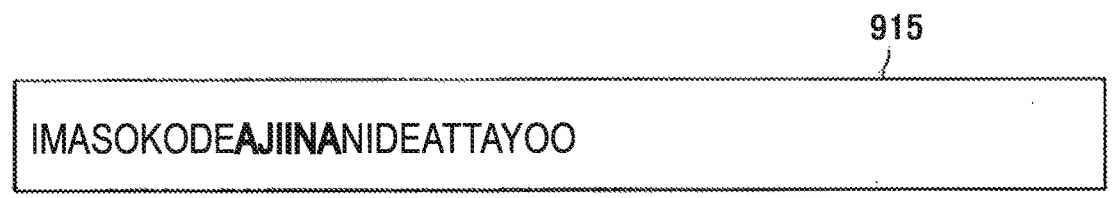
FIG. 9D is an explanatory view of an example of an image of an input field in the third input example.

"Ajiina," which has been identified as an unknown word, is written "ajiina" in katakana, which are predetermined phonograms, and is also displayed in decorative characters that differ from other characters, in the input field 915, as shown in FIG. 9D. As a result, the user 3 is able to verify that "ajiina" has been identified as an unknown word. When the user 3 verifies that "ajiina" has been identified as an unknown word as intended, the user 3 is then able to register "ajiina" that has been identified as an unknown word in a database by confirming the utterance information "imasoko-deajiinanideattayoo."

The threshold value for the length of the prolonged sound can be changed by changing the setting of the display time of the threshold value image 945 that is an indicator which indicates the time to the threshold value for identifying an unknown word, similar to the first unknown word input example. The setting of the display time can also be changed for the prolonged sound determination image 946 that is an indicator which indicates the time to the threshold value at which an unknown word is identified as having a prolonged sound, similar to the threshold value image 945. The "indicator start time" and the "indicator recognition time" of the threshold value image 945 and the prolonged sound determination image 946 may be changed independently of each other by the user 3, or may be dynamically changed independently of each other by the information processing apparatus 1 on the basis of the normal rate of utterance of the user 3.

4.4. Example of Input Correction

Figure 10:
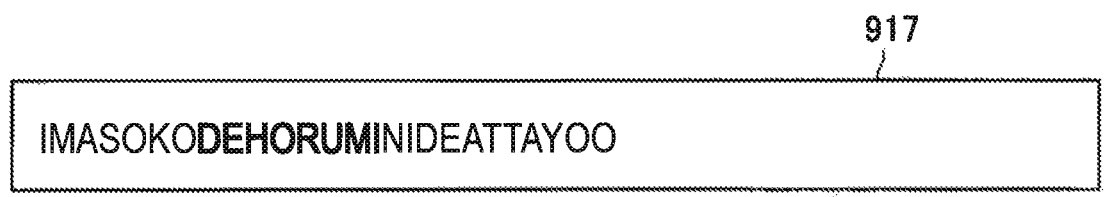
FIG. 10 is an explanatory view of an example of an image of an input field in which an unknown word is incorrectly identified.

Next, an example of unknown word input correction according to the present embodiment will be described with reference to FIG. 10. FIG. 10 is an explanatory view of an example of an image of an input field in which an unknown word is incorrectly identified.

If "dehorumi" ends up being identified as an unknown word in the input field 917 even though the user 3 tried to aurally input "horumi" as an unknown word, as shown in FIG. 10, for example, the user 3 needs to re-input the unknown word in the input field 917.

In such a case, the user 3 can correct the identified unknown word from "dehorumi" to "horumi" by redoing the voice input for the entire sentence of the utterance information or a portion of the utterance information that includes "dehorumi" again, as long as it is before the utterance information that has been input to the input field 917 has been confirmed or sent.

Here, "horumi," not "dehorumi," will be registered as an unknown word when utterance information that has been input to the input field 917 has been confirmed or sent after "dehorumi" has been corrected to "horumi." When the user 3 redoes a portion of the voice input, the utterance recognizing portion 103 may determine the utterance part where the user 3 has redone the voice input according to pattern matching or the like, and overwrite the utterance information of that part.

As a result, the user 3 is able to prevent an unintended word from being identified as an unknown word and registered in a database due to an utterance mistake or the like.

4.5. Modified Example

Figure 11A:
FIG. 11A is an explanatory view of an example of an image of an input field in a modified example.

Continuing on, a modified example of unknown word input according to the present embodiment will be described with reference to FIGS. 11A to 12. FIGS. 11A to 11C are explanatory views of an example of an image of an input field in a modified example, and FIG. 12 is an explanatory view of an example of an image when a registered unknown word has been aurally input according to a normal utterance method.

The modified example of unknown word input according to the present embodiment is an example of identifying and registering an unknown word when utterance information is in a language written in an alphabet such as English. In such a case, the user 3 can have the information processing apparatus 1 identify an unknown word and register the identified unknown word by uttering the alphabetic spelling and pronunciation of an unknown word, in addition to uttering the unknown word in a manner that satisfies a predetermined condition (e.g., uttering according to a predetermined utterance method).

Figure 11B:
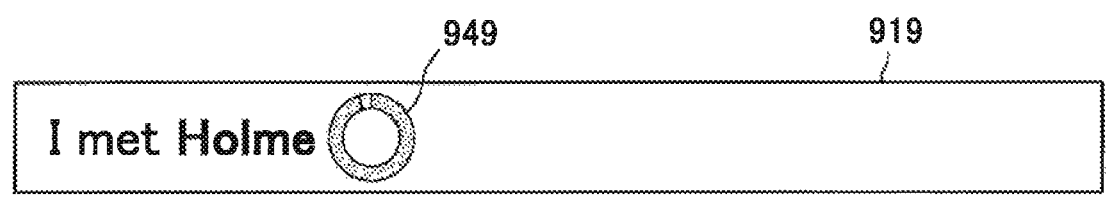
FIG. 11B is an explanatory view of an example of an image of an input field in the modified example.
Figure 11C:
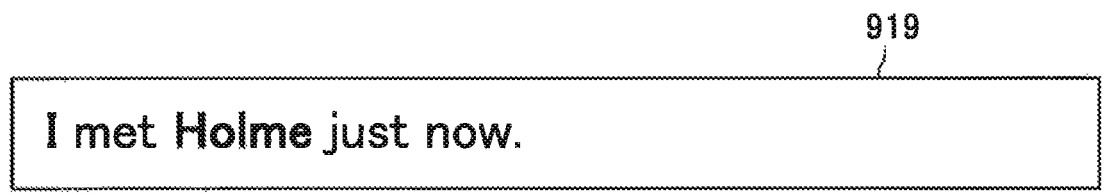
FIG. 11C is an explanatory view of an example of an image of an input field in the modified example.

As shown in FIGS. 11A to 11C, if the user 3 wants the information processing apparatus 1 to identify "Holme" as an unknown word, the user 3 need only utter "H," "0," "L," "M," and "E," which is the alphabetic spelling, and "hourn," which is the pronunciation, in a manner that satisfies a predetermined condition.

More specifically, if the predetermined condition is uttering with a pause of a length equal to or longer than a threshold value after each character, similar to the first input example, the user 3 is able to have the information processing apparatus 1 identify "Holme" as an unknown word by uttering each of "H," "O," "L," "M," and "E," and "houm" with a pause of a length equal to or longer than a threshold value.

In such a case, a threshold value image 949 that is an indicator which indicates the time to a threshold value for identifying an unknown word may be displayed in the input field 919, similar to the first input example. Also, "Holme," which has been identified as an unknown word, may be displayed in decorative characters that differ from other characters, in the input field 919, as shown in FIG. 11C.

According to the input example illustrated in FIGS. 11A to 11C, when "Holme" has been registered in a database as an unknown word, "Holme" will be recognized as an unsegmented single word and will be displayed in the input field 919 even if the user 3 does not utter according to the predetermined utterance method, as shown in FIG. 12. Also, the user 3 is able to confirm the utterance information that has been aurally input and send that utterance information to a recipient in a voice chat or the like, by pressing a "Send"

button 929. A microphone image 939 is a schematic image of a microphone, which indicates that utterance information displayed in the input field 919 has been input by voice input.

5. HARDWARE CONFIGURATION EXAMPLE

Figure 13:
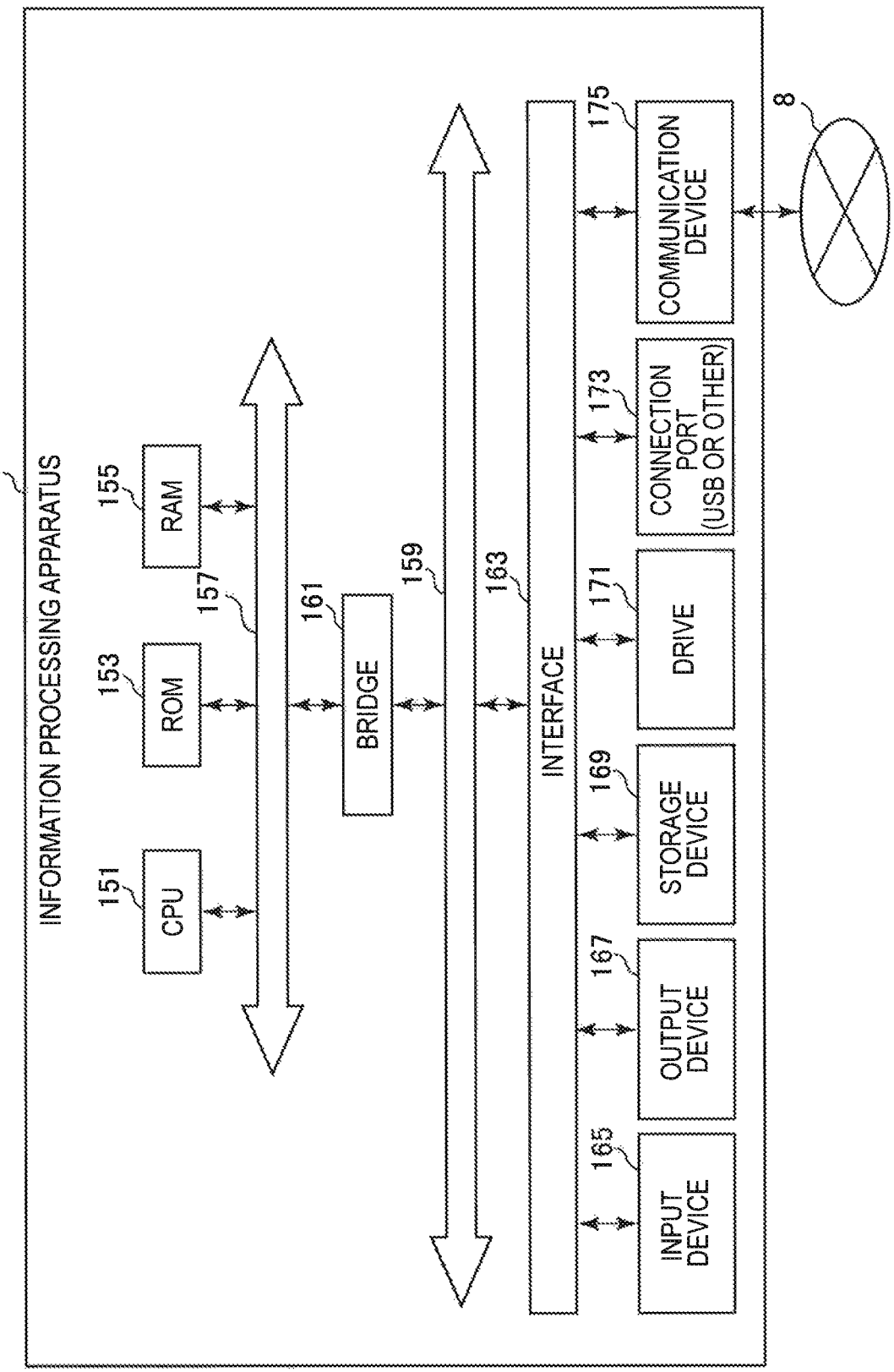
FIG. 13 is a block diagram of a hardware configuration example of an information processing apparatus according to an embodiment of the present disclosure.

Hereinafter, a hardware configuration example of the information processing apparatus according to the present embodiment will be described with reference to FIG. 13. FIG. 13 is a block diagram of a hardware configuration example of the information processing apparatus 1 according to the present embodiment. Information processing by the information processing apparatus according to the present embodiment is realized through the cooperation of software and hardware.

As shown in FIG. 13, the information processing apparatus 1 includes a central processing unit (CPU) 151, read only memory (ROM) 153, random access memory (RAM) 155, a bridge 161, internal buses 157 and 159, an interface 163, an input device 165, an output device 167, a storage device 169, a drive 171, a connection port 173, and a communication device 175.

The CPU 151 functions as an operation processing device and a control device, and controls the overall operation of the information processing apparatus 1 in accordance with various programs stored in the ROM 153 and the like. The ROM 153 stores programs and operation parameters used by the CPU 151, and the RAM 155 temporarily stores programs used in the execution by the CPU 151, and parameters and the like that change appropriately in that execution. For example, the CPU 151 may execute the functions of the utterance recognizing portion 103, the identifying portion 105, the identification control portion 107, the image generating portion 109, and the processing portion 111, and the like.

The CPU 151, the ROM 153, and the RAM 155 are connected together by the bridge 161 and the internal buses 157 and 159 and the like. The CPU 151, the ROM 153, and the RAM 155 are also connected to the input device 165, the output device 167, the storage device 169, the drive 171, the connection port 173, and the connection device 175, via the interface 163.

The input device 165 includes an input device into which information is input, such as a touch panel, a keyboard, a button, a microphone, a switch, and a lever. The input device 165 also includes an input control circuit that generates an input signal on the basis of the input information, and outputs the generated input signal to the CPU 151, and the like.

The output device 167 includes a display device such as a CRT display device, a liquid crystal display device, or an organic EL display device, for example. Furthermore, the output device 167 may include a voice output device such as a speaker and headphones.

The storage device 169 is a device for storing data and is configured as an example of the storing portion of the information processing apparatus 1. The storage device 169 may include a storage medium, a storage device that stores data in a storage medium, a readout device that reads out data from a storage medium, and deletion device that deletes stored data. The storage device 169 may also execute the function of the database storing portion 113 and the like.

The drive 171 is a reader/writer for a storage medium, and is built into, or externally attached to, the information processing apparatus 1. For example, the drive 171 reads information stored on an inserted removable storage medium such as a magnetic disk, an optical disk, a magneto optical disk, or semiconductor memory, and outputs this information to the RAM 153. The drive 171 is also able to write information to a removable storage medium.

The connection port 173 is a connection interface formed by, for example, a USB port, an Ethernet (registered trademark) port, an IEEE802.11 standard port, and a connection port for connecting an externally connected device such as an optical audio terminal. The connection portion 173 may execute the function of the voice acquiring portion 101 and the like.

The communication device 175 is a communication interface formed by, for example, a communication device or the like for connecting to a network 8 such as a public network or a private network or the like. The communication device 175 may also be a wired or wireless LAN compatible communication device, or a cable communication device that performs wired communication via a cable.

Also, it is also possible to create a computer program for causing hardware such as the CPU, ROM, and RAM built into the information processing apparatus 1 to display functions equivalent to the functions of the components of the information processing apparatus according to the present embodiment described above. Also, a storage medium that stores the computer program is also provided.

6. SUMMARY

As described above, the information processing apparatus 1 according to the present embodiment enables the user 3 to intentionally register unknown words by a more convenient method, and thus makes it possible to efficiently create a database in which unknown words are registered.

Also, an uttered unknown word that satisfies a predetermined condition is not segmented, but rather is regarded and aurally recognized as a single word, so the information processing apparatus 1 is able to prevent an unknown word from being segmented or displayed in notation that are unintended by the user 3. Also, a registered unknown word will hereinafter not be segmented, but rather will be regarded as a single word, so the information processing apparatus 1 is able to make voice input more convenient for the user 3.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

an identifying portion that identifies a word uttered according to a predetermined utterance method, from within utterance information of a user, as an unknown word; and a processing portion that performs processing to register the unknown word that has been identified.

(2)
The information processing apparatus according to (1), wherein the predetermined utterance method is a method of uttering with a pause of a length equal to or longer than a threshold value after each character.
(3)
The information processing apparatus according to (1), wherein the predetermined utterance method is a method of uttering each character at a volume equal to or louder than a threshold value.
(4)
The information processing apparatus according to (1), wherein the predetermined utterance method is a method of uttering each character with a prolonged sound of a length equal to or longer than a threshold value.
(5)
The information processing apparatus according to any one of (2) to (4), wherein the threshold value in the predetermined utterance method is controlled on the basis of information related to the user.
(6)
The information processing apparatus according to (5), wherein the information related to the user is a rate of utterance of the user.
(7)
The information processing apparatus according to (5), wherein the information related to the user is information related to a body of the user.
(8)
The information processing apparatus according to any one of (2) to (4), wherein the threshold value in the predetermined utterance method is controlled on the basis of information related to content of the utterance information that is input.
(9)
The information processing apparatus according to any one of (2) to (4), wherein the threshold value in the predetermined utterance method is controlled on the basis of information related to an environment around the user.
(10)
The information processing apparatus according to any one of (2) to (4), wherein the threshold value in the predetermined utterance method is controlled on the basis of information related to a voice input device that acquires the utterance information.
(11)
The information processing apparatus according to any one of (1) to (10), further including an image generating portion that generates an utterance image that displays the utterance information of the user that has been recognized, with a character.
(12)
The information processing apparatus according to (11), wherein the image generating portion further generates a threshold value image that displays a threshold value in the predetermined utterance method.
(13)
The information processing apparatus according to (11) or (12), wherein the unknown word is displayed with a predetermined phonogram in the utterance image.
(14)
The information processing apparatus according to any one of (11) to (13), wherein the unknown word is displayed in notation that differs from notation of other utterance information in the utterance image.
(15)
The information processing apparatus according to any one of (1) to (14), wherein when a language of the utterance information of the user is a language written in an alphabet, utterance of alphabetic spelling and pronunciation of the unknown word is also included in the predetermined utterance method.
(16)
The information processing apparatus according to any one of (1) to (15), wherein when the user re-utters the utterance information, the utterance information is corrected to the re-uttered utterance information.
(17)
The information processing apparatus according to any one of (1) to (16), wherein the processing portion performs processing to register the unknown word included in the utterance information when the user has confirmed the utterance information.
(18)
The information processing apparatus according to any one of (1) to (17), wherein the unknown word that has been registered is regarded as an unsegmented single word.
(19)
An information processing method performed by an operation processing device, the method including:
    identifying a word uttered according to a predetermined utterance method, from within utterance information of a user, as an unknown word; and performing processing to register the unknown word that has been identified.
(20)
A program that causes a computer to function as:
    an identifying portion that identifies a word uttered according to a predetermined utterance method, from within utterance information of a user, as an unknown word; and
    a processing portion that performs processing to register the unknown word that has been identified.

REFERENCE SIGNS LIST 1 information processing apparatus
3 user
5 voice input device
7 operation input device
9 display device
101 voice acquiring portion
103 utterance recognizing portion
105 identifying portion
107 identification control portion
109 image generating portion
111 processing portion
113 database storing portion

The invention claimed is:
1. An information processing apparatus comprising:
    an identifying portion that identifies a word uttered according to a predetermined utterance method, from within utterance information of a user, as an unknown word;
    an image generating portion that generates an image that indicates whether an utterance by the user corresponds to the predetermined utterance method; and
    a processing portion that performs processing to register the unknown word that has been identified,
    wherein the image includes a threshold value image that displays a threshold value indicating to the user that the uttered word is identified as the unknown word when the predetermined utterance method is satisfied, and wherein the identifying portion, the image generating portion, and the processing portion are each implemented via at least one processor.

2. The information processing apparatus according to claim 1, wherein the predetermined utterance method is a method of uttering with a pause of a length equal to or longer than a threshold value after each character.

3. The information processing apparatus according to claim 1, wherein the predetermined utterance method is a method of uttering each character at a volume equal to or louder than a threshold value.

4. The information processing apparatus according to claim 1, wherein the predetermined utterance method is a method of uttering each character with a prolonged sound of a length equal to or longer than a threshold value.

5. The information processing apparatus according to claim 2, wherein the threshold value in the predetermined utterance method is controlled on the basis of information related to the user.

6. The information processing apparatus according to claim 5, wherein the information related to the user is a rate of utterance of the user.

7. The information processing apparatus according to claim 5, wherein the information related to the user is information related to a body of the user.

8. The information processing apparatus according to claim 2, wherein the threshold value in the predetermined utterance method is controlled on the basis of information related to content of the utterance information that is input.

9. The information processing apparatus according to claim 2, wherein the threshold value in the predetermined utterance method is controlled on the basis of information related to an environment around the user.

10. The information processing apparatus according to claim 2, wherein the threshold value in the predetermined utterance method is controlled on the basis of information related to a voice input device that acquires the utterance information.

11. The information processing apparatus according to claim 1, wherein the image generating portion generates an utterance image that displays the utterance information of the user that has been recognized, with a character.

12. The information processing apparatus according to claim 11, wherein the unknown word is displayed with a predetermined phonogram in the utterance image.

13. The information processing apparatus according to claim 11, wherein the unknown word is displayed in notation that differs from notation of other utterance information in the utterance image.

14. The information processing apparatus according to claim 1, wherein when a language of the utterance information of the user is a language written in an alphabet, utterance of alphabetic spelling and pronunciation of the unknown word is also included in the predetermined utterance method.

15. The information processing apparatus according to claim 1, wherein when the user re-utters the utterance information, the utterance information is corrected to the re-uttered utterance information.

16. The information processing apparatus according to claim 1, wherein the processing portion performs processing to register the unknown word included in the utterance information when the user has confirmed the utterance information.

17. The information processing apparatus according to claim 1, wherein the unknown word that has been registered is regarded as an unsegmented single word.

18. An information processing method performed by an operation processing device, the method comprising:
identifying a word uttered according to a predetermined utterance method, from within utterance information of a user, as an unknown word;
generating an image that indicates whether an utterance by the user corresponds to the predetermined utterance method; and
performing processing to register the unknown word that has been identified,
wherein the image includes a threshold value image that displays a threshold value indicating to the user that the uttered word is identified as the unknown word when the predetermined utterance method is satisfied.

19. A non-transitory computer-readable medium having embodied thereon a program, which when executed by a computer causes the computer to execute a method, the method comprising:
identifying a word uttered according to a predetermined utterance method, from within utterance information of a user, as an unknown word;
generating an image that indicates whether an utterance by the user corresponds to the predetermined utterance method; and
performing processing to register the unknown word that has been identified,
wherein the image includes a threshold value image that displays a threshold value indicating to the user that the uttered word is identified as the unknown word when the predetermined utterance method is satisfied.

20. The information processing apparatus according to claim 1, further comprising an identification control portion that controls execution of an identification operation by the identifying portion, on the basis of eye gaze information of the user.

21. The information processing apparatus according to claim 1, wherein the threshold value image indicates to the user a time to the threshold value in the predetermined utterance method.

* * * * *